United States Patent Office 3,496,465
Patented Feb. 17, 1970

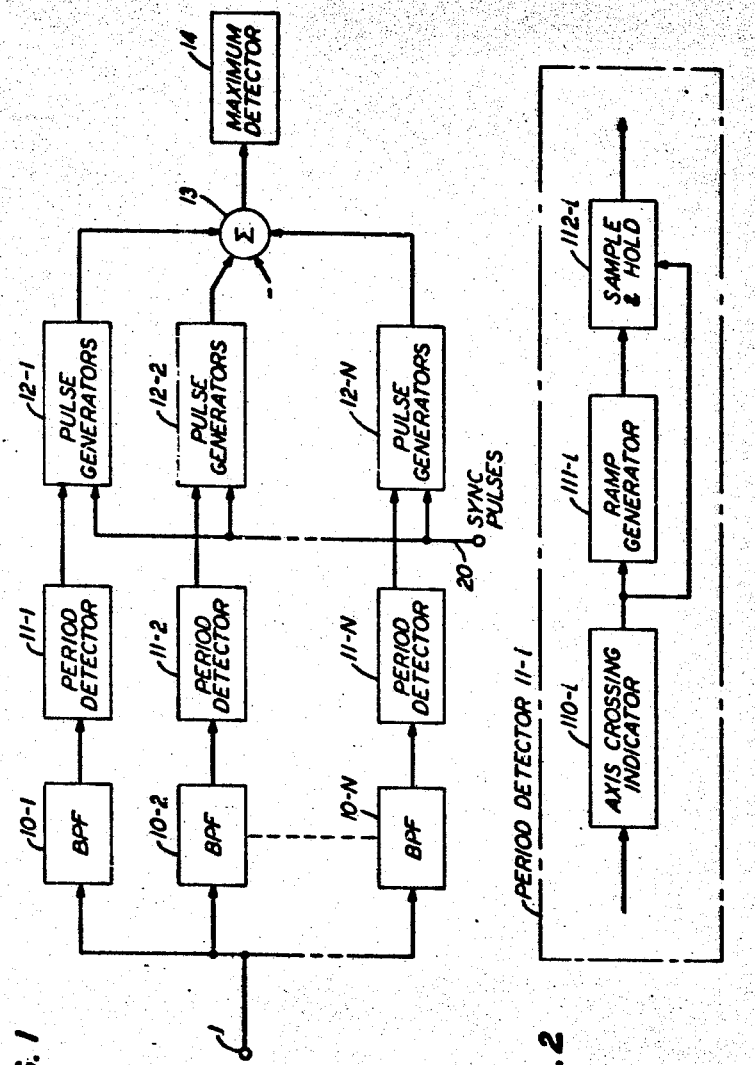

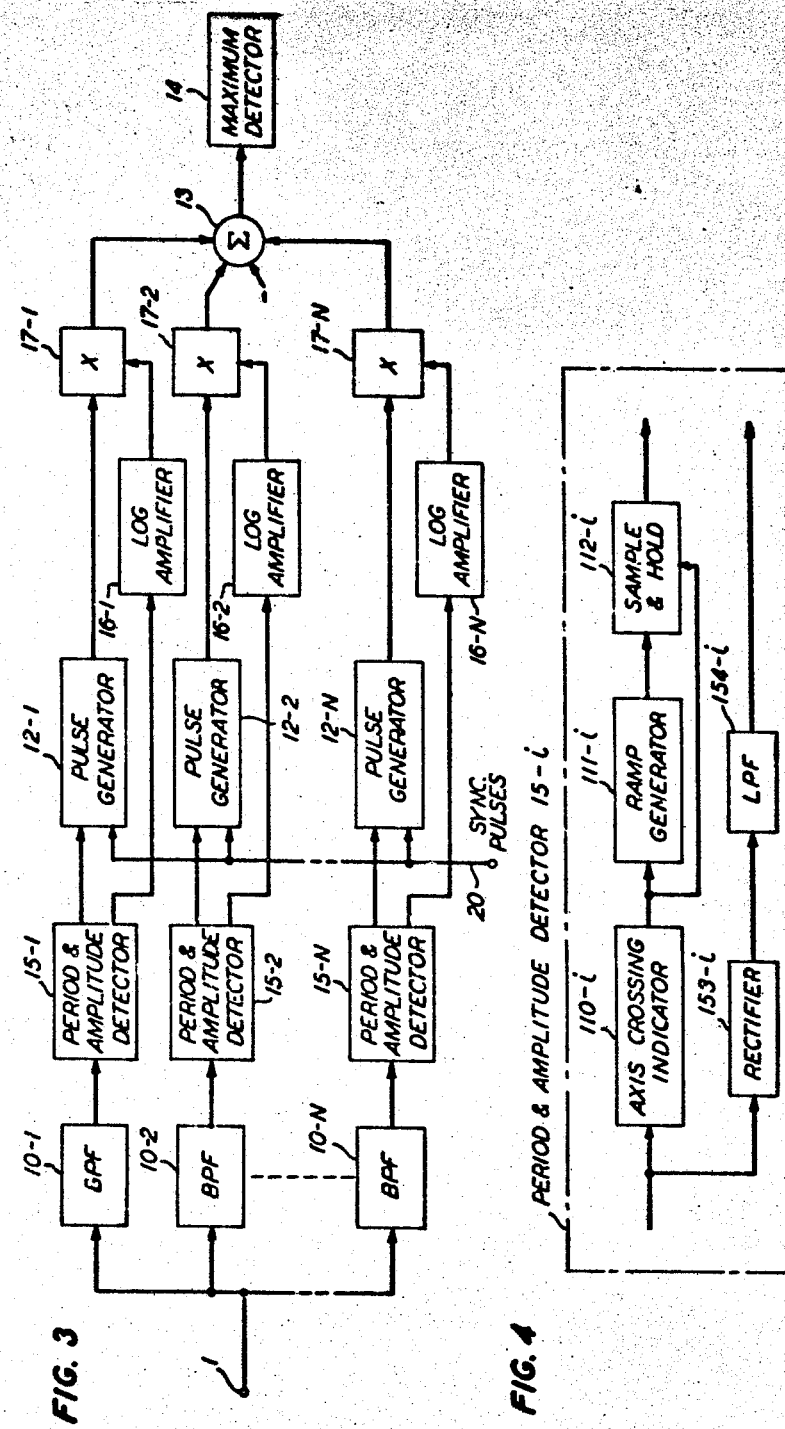

3,496,465
FUNDAMENTAL FREQUENCY DETECTOR
Manfred R. Schroeder, Gillette, N.J., assignor to Bell Telephone Laboratories, Incorporated, Murray Hill and Berkeley Heights, N.J., a corporation of New York
Filed May 19, 1967, Ser. No. 639,733
Int. Cl. G01r 23/16
U.S. Cl. 324—77   9 Claims

ABSTRACT OF THE DISCLOSURE

The missing or obscured fundamental frequency of a complex periodic signal is found by obtaining the smallest common multiple of the periods of the detectable harmonic components of the complex periodic signal. This multiple corresponds to the period of the fundamental frequency, and thus can be used to generate the fundamental frequency. Alternatively, the frequency of each detectable harmonic component of the complex periodic signal is divided by a series of integers. The quotient frequency common to all harmonics is the fundamental frequency.

Background of the invention

This invention relates to signal processing and, in particular, to the generation of the fundamental frequency of a complex periodic signal whose fundamental component is missing.

In speech, the fundamental or pitch frequency and one or more of its harmonics are often either missing or obscured by noise. To produce a high quality replica of such speech from coded signals representing the speech, as, for example, in a vocoder, the fundamental frequency of the speech must be determined.

One method of determining the fundamental frequency of such a speech signal, exemplified by R. L. Miller Patent 2,627,541, issued Feb. 3, 1953, involves tracking harmonics of the fundamental frequency. Signals representative of the frequencies of these harmonics are each divided by an integer corresponding to the order of the harmonic. The resulting quotient signals, when equal to each other, represent the fundamental frequency. Unfortunately, in the absence of the fundamental, one does not always know the order of the harmonics present. Thus, often the quotient signals are not equal and the fundamental frequency remains undetermined.

Another technique for determining the fundamental frequency of a speech signal is disclosed in an article entitled "Pitch Extraction by Computer Processing of High-Resolution Fourier Analysis Data" by Harris and Weiss, vol. 35, The Journal of the Ecoustical Society of America, p. 339. Harmonic peaks of the short time amplitude spectrum are detected and the frequency differences between contiguous harmonic peaks are calculated. The instantaneous fundamental frequency equals the average of these frequency differences after the removal of any spurious information. Harris' and Weiss' technique requires calculation of the amplitude spectrum and its peaks. Apparatus to do this is expensive. Moreover, if for any reason adjacent harmonics are obscured by noise or absent, the resulting measure of the fundamental frequency is inaccurate.

Summary of the invention

This invention provides systems for, and methods of, obtaining the fundamental frequency of a complex periodic signal which avoid the disadvantages of the prior art. Like Harris' and Weiss' method, this invention provides a statistical estimate of the fundamental frequency. But unlike Harris' and Weiss' method, it does not require generation of the amplitude spectrum, per se. Nor does it require knowledge of the order of the harmonics, as does Miller's method.

According to this invention, the smallest common multiple of the periods of the detectable harmonic components of the complex periodic signal is computed. This multiple is the period of the fundamental component of the signal.

Alternatively, signals representing the frequencies of the detectable harmonic components of the complex periodic signal are each divided by a series of integers. The largest quotient signal common to all harmonics is proportional to the fundamental frequency.

In one embodiment of this invention, the complex periodic signal is divided into a plurality of subsignals occupying contiguous bandwidths. The periods of these subsignals are detected and voltages proportional to these periods are generated. Periodically synchronized sequences of pulses are then produced, each sequence possessing a pulse spacing proportional to a corresponding one of the voltages. The resulting pulse sequences are summed to produce a series of nonuniform amplitude pulses—a so-called "period histogram." The amplitude of each pulse in this series depends on the total number of simultaneously generated pulses in the pulse sequences. The time of occurrence of the pulse of maximum amplitude corresponds to the period of the fundamental component.

In one alternative embodiment of this invention, the amplitudes of the pulses in each pulse sequence are weighted by the logarithm of the amplitude of the subsignal from which the sequence was derived. The fundamental frequency derived from the period histogram constructed from the resulting weighted pulses is more reliable than the fundamental frequency derived from a period histogram constructed from unweighted pulse sequences.

In another alternative embodiment of this invention, the frequencies of the subsignals derived from the complex periodic signal are converted to voltages. Each of these voltages is divided by a plurality of selected integers. The resulting quotient signals are analyzed, and the most frequently occurring quotient signal, which is proportional to the fundamental frequency, is detected by analyzing a "frequency histogram" derived from the quotient signals. The resulting most frequently occurring quotient signal is converted to a signal at the fundamental frequency. Weighting the quotient signals by the amplitudes of the subsignals from which they were derived enhances the reliability of the estimate of the fundamental frequency.

This invention produces a fundamental frequency which compares favorably in accuracy to the fundamental frequency obtained by the well-known "cepstral" technique discussed by A. M. Noll in an article entitled "Short-Time Spectrum and 'Cepstrum' Techniques for Vocal-Pitch Detection" in vol. 36, The Journal of the Acoustical Society of America, pp. 296-302, February 1964. However, the implementation of this invention is simpler than the cepstral implementation. In addition, less spectral resolution is needed in this invention than in a cepstrum analyzer yielding equivalent accuracy.

This invention may be more fully understood from the following detailed description taken together with the attached drawings.

Brief description of the drawing

FIG. 1 is a schematic block diagram of one embodiment of this invention;

FIG. 2 is a schematic block diagram of a typical period detector 11 shown in FIG. 1;

FIG. 3 is a schematic block diagram of another embodiment of this invention;

FIG. 4 is a block diagram of a typical period and amplitude detector 15 shown in FIG. 3;

Detailed description

Figure 5:
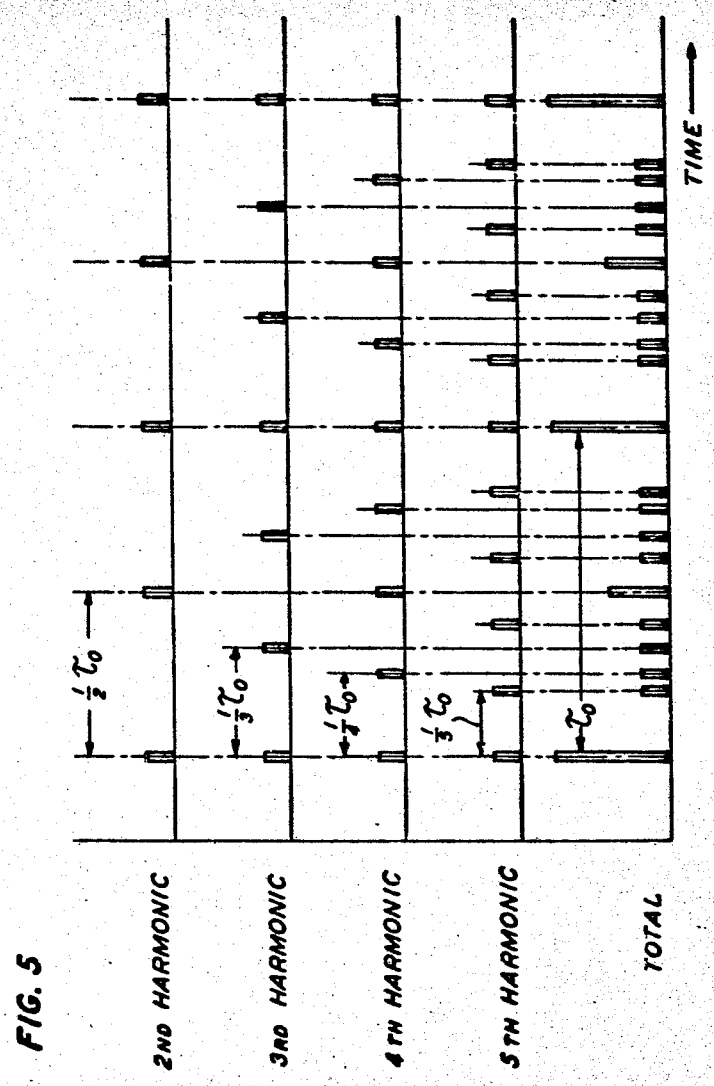
FIG. 5 shows a typical period histogram generated by the embodiments of FIGS. 1 and 3.

FIG. 1 shows one embodiment of this invention. A complex periodic signal, such as a speech signal, is detected by transducer 1, of well-known design. Transducer 1 converts this complex periodic signal into an electrical signal which is divided into a plurality of subsignals by bandpass filters 10–1 through 10–$N$, where $N$ is a selected integer. The cutoff frequencies of filters 10 are selected so that each filter passes at most one harmonic of the complex periodic signal.

Each subsignal is processed by a corresponding one of period detectors 11–1 through 11–$N$. A typical detector 11–$i$, shown in FIG. 2, consists of axis crossing indicator 110–$i$, ramp generator 111–$i$ and sample-and-hold circuit 112–$i$, where $i$ is a selected integer with a value given by $1 \leq i \leq N$. Axis crossing indicator 110–$i$, a device well known in the signal processing art, produces a pulse at every positive axis crossing of the input subsignal. This pulse activates sample-and-hold circuit 112–$i$ which samples the voltage on ramp generator 111–$i$. In addition, this pulse resets ramp generator 111–$i$ to the zero output voltage level after circuit 112–$i$ samples its output voltage.

The output voltages from period detectors 11–1 through 11–$N$ control pulse generators 12–1 through 12–$N$. Each of these generators produces a sequence of output pulses at a repetition rate inversely proportional to the output voltage from a corresponding one of detectors 11, at the time of occurrence of a synchronization pulse. Such synchronization pulses are transmitted on lead 20 from a synchronization pulse source (not shown) of well-known design. These synchronization pulses occur, for example, every 15 milliseconds. Thus, the output voltages from period detectors 11–1 through 11–$N$, at the times of these synchronization pulses, control the rates at which the corresponding pulse generators 12–1 through 12–$N$ produce output pulses for the next 15 milliseconds.

Each of pulse generators 12–1 through 12–$N$ produces a sequence of pulses at a unique frequency. The resulting pulse sequences, all started simultaneously by a synchronization pulse, are summed in network 13 to produce a series of nonuniform amplitude pulses. Each pulse in this series has an amplitude proportional to the number of simultaneously occurring pulses in the pulse sequences. Thus, the series of nonuniform amplitude pulses from network 13 represents a so-called "period histogram." The time associated with the earliest occurring maximum amplitude pulse in this histogram corresponds to the period of the fundamental component of the complex periodic signal. This maximum amplitude pulse is located in maximum detector 14. Detector 14 likewise is of well-known design and thus will not be described in detail.

FIG. 3 shows an alternative embodiment of this invention. This embodiment is identical to the embodiment shown in FIG. 1 except that the amplitudes of the pulses in each pulse sequence produced by generators 12–1 through 12–$N$ are weighted by an amount proportional to the logarithm of the amplitude of the subsignal from which they were derived. Thus, period detectors 11–1 through 11–$N$ shown in FIG. 1 become, in this embodiment, period and amplitude detectors 15–1 through 15–$N$.

A typical detector 15–$i$, shown in more detail in FIG. 4, includes in addition to axis crossing indicator 110–$i$, ramp generator 111–$i$, and sample-and-hold circuit 112–$i$, a rectifier 153–$i$, and a low-pass filter 154–$i$. The output signal from low-pass filter 154–$i$ represents the amplitude of the input subsignal to the period detector 15–$i$.

This signal is passed through a corresponding logarithmic amplifier 16–$i$ in the apparatus of FIG. 3 to produce a voltage proportional to the logarithm of the amplitude of the input subsignal. The output voltages from amplifiers 16–1 through 16–$N$ modulate, e.g., by multiplication, the sequences of pulses from pulse generators 12–1 through 12–$N$ in networks 17–1 through 17–$N$, respectively. Thus, the amplitude of each pulse sequence is made proportional to the amplitude of the input subsignal from which it was derived. This enhances the weight given in the period histogram to pulses generated by large amplitude subsignals while reducing the weight given to pulses generated by small amplitude subsignals.

The resulting amplitude modulated pulse sequences are again combined in network 13 to produce a weighted period histogram.

Detector 14 again detects the time associated with the maximum amplitude pulse in this histogram. This time corresponds to the period of the fundamental frequency of the complex periodic signal.

FIG. 5 illustrates schematically the operation of the embodiments shown in FIGS. 1 and 3. Each sequence of pulses shown in this figure represents, as labeled, the pulse sequence produced by one of pulse generators 12–1 through 12–$N$ (FIGS. 1 or 3) from a corresponding harmonic of the complex periodic signal being analyzed. While the pulse sequencies shown are derived from the second through the fifth harmonics, a similar diagram can be constructed for any combination of harmonics.

As shown in FIG. 1 or FIG. 3, summing network 13 combines the pulse sequences from generators 12–1 through 12–$N$ to produce a series of nonuniform amplitude pulses. This series is shown in FIG. 5 in the row labeled "Total." The amplitude of each pulse in this series represents the number of pulses simultaneously occurring at the time corresponding to this pulse. The histogram nature of the output signal from network 13 (FIG. 1 or 3) is apparent. FIG. 5 shows that the pulses of maximum amplitude in this nonuniform amplitude pulse series are separated by the fundamental period $\tau_0$ of the complex periodic signal.

Figure 6:
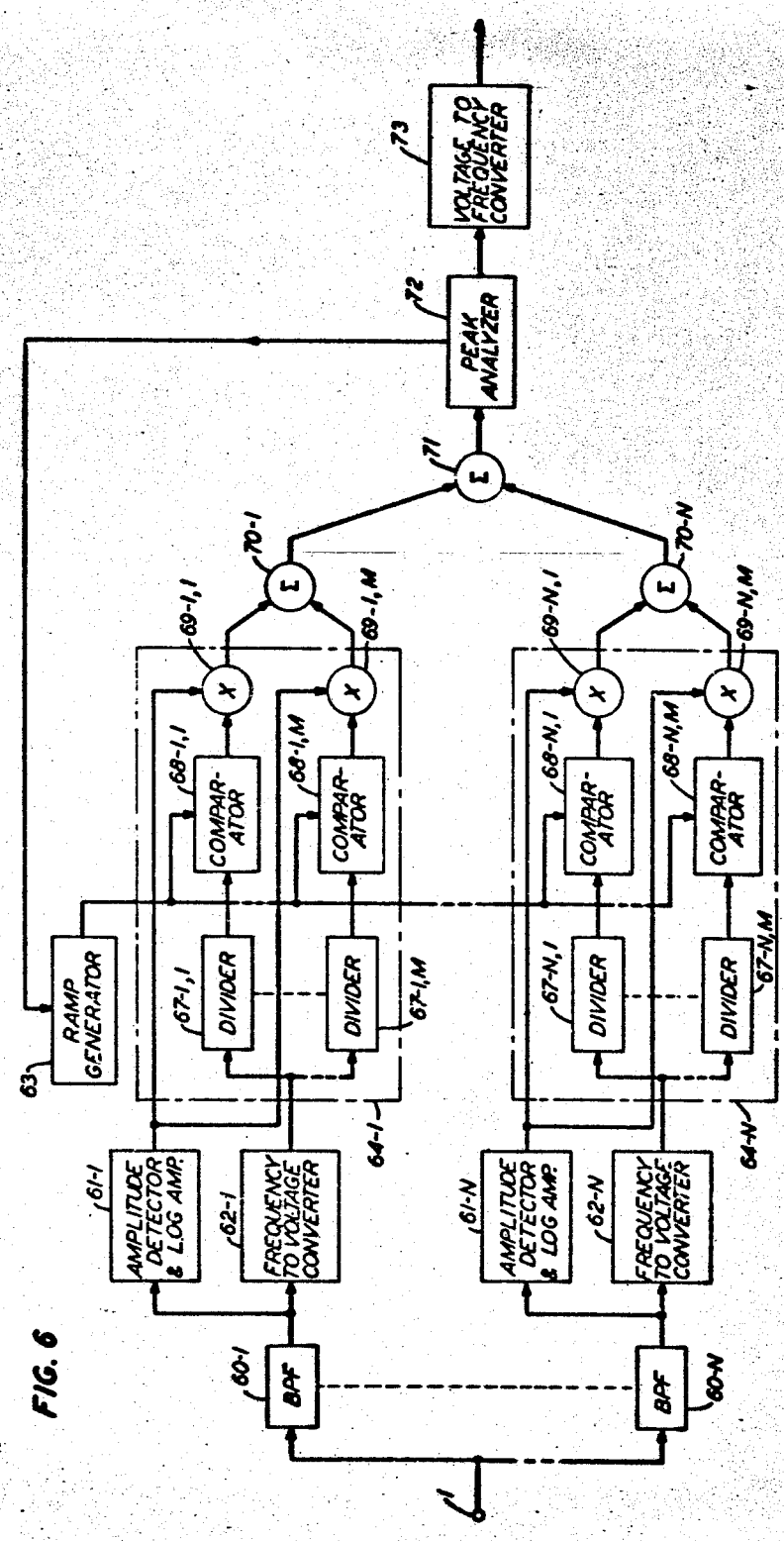
FIG. 6 is a schematic block diagram of an alternative embodiment of this invention.

FIG. 6 shows another embodiment of this invention. In this embodiment, voltages proportional to the frequencies of the detectable harmonic components of the complex periodic signal are divided by selected integers. The largest quotient voltage common to all detectable harmonics is proportional to the fundamental frequency.

As before, a complex periodic signal is converted into an electrical signal by transducer 1. This electrical signal is divided into a plurality of subsignals by bandpass filters 60–1 through 60–$N$. Again, the passbands of these filters are selected so that each filter passes at most one harmonic of the complex periodic signal. The frequencies of the subsignals are converted to voltages in frequency-to-voltage converters 62–1 to 62–$N$. The output voltage from each converter 62–$i$ is then simultaneously divided by selected integers in a corresponding one of dividing networks 64–1 through 64–$N$.

For simplicity, the operation of only one of the dividing networks 64 will be described in detail. The other networks, of course, operate in similar fashion. Thus, for example, the output voltage from converter 62–1 is divided by selected integers in voltage dividers 67–1, 1 through 67–1, M where M is an integer. These voltage dividers, in one embodiment, are potentiometers. The integral divisors, represented by the settings of the potentiometers, are selected to include, and bracket, if possible, the expected harmonic order. Thus, if the second harmonic is expected to be detected by filters 60–1, dividers 67-1 through 67-M would represent division by 1, 2, ... M, respectively.

The output voltages from dividers 67-1, 1 through 67-1, M are compared in comparators 68-1, 1 through 68-1, M to a voltage, which increases linearly with time, from ramp generator 73. Comparator 68-1, $j$, where $j$ is an integer given by $1 \leq j \leq M$, produces a pulse when the voltage from the ramp generator 63 equals the voltage from the corresponding divider 67-1, $j$. The output pulse from each comparator is multiplied in a corresponding one of networks 69-1, 1 through 69-1, M by a signal proportional to the logarithm of the amplitude of the subsignal passed through bandpass filter 60-1. This logarithmic signal is derived in a well-known manner in amplitude detector and logarithmic amplifier 61-1. The nonsimultaneously occurring output pulses from multipliers 69-1, 1 through 69-1, M are combined in summing network 70-1 to produce a sequence of pulses. Each pulse in this sequence occurs at a time proportional to the magnitude of one of the quotient signals from dividers 67-1, 1 through 67-1, M.

The remaining subsignals from filters 60-2 (not shown) through 60-N are similarly processed to produce similar sequences of pulses. The time of occurrence of each pulse in each sequence is proportional to a corresponding frequency. The later the occurrence of the pulse, the higher the frequency which it represents.

The resulting pulse sequences are combined in summing network 71 to yield a series of pulses representing a so-called "frequency histogram." The time of occurrence of the maximum amplitude pulse in this pulse series is proportional to the fundamental frequency of the complex periodic signal. The time of occurrence of this peak pulse is determined in peak analyzer 72.

Analyzer 72 produces an output voltage proportional to the time of occurrence of this peak pulse, and converter 73 converts this voltage to a signal at the fundamental frequency. Analyzer 72, in addition, produces a reset pulse to reset ramp generator 63 to zero voltage after the detection of the peak pulse in the frequency histogram from network 71. Alternatively, ramp generator 63 is reset to zero on the passage of a time greater than the fundamental period of the complex periodic signal. When speech is being analyzed, this time might, for example, be 20 milliseconds, which corresponds to a minimum fundamental frequency of 50 cycles per second.

Figure 7:
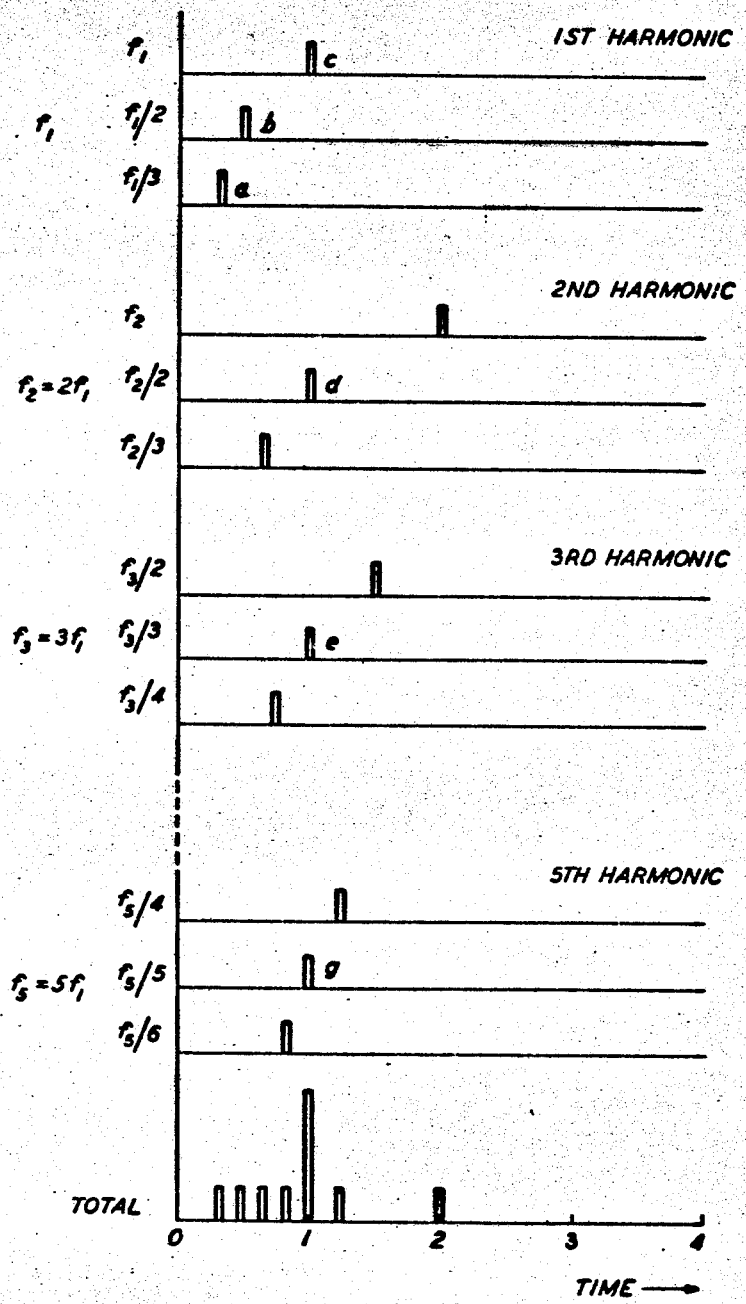
FIG. 7 shows a typical frequency histogram generated by the embodiment of FIG. 6.

FIG. 7 illustrates the operation of the embodiment of FIG. 6 when only the first, second, third and fifth harmonics are present in the input signal. The pulses shown in FIG. 7 are obtained by dividing the first and second harmonics by the integers 1, 2 and 3, the third harmonic by the integers 2, 3 and 4, and the fifth harmonic by the integers 4, 5 and 6. The abscissa represents time, positively increasing to the right.

A typical set of pulses is generated from the first harmonic of the complex periodic signal. This harmonic is passed, for example, by bandpass filters 60-1 (FIG. 6). Divider circuits 67-1, 1 through 67-1, 3 (letting $M=3$) divide the voltage from converter 62-1 by the integers 1, 2 and 3. Under these conditions, the first output pulse from comparators 68-1, 1 through 68-1, 3 occurs when the voltage from ramp generator 63 matches the voltage from divider 67-1, 3, which produces the lowest output voltage of any of dividers 67-1, 1 through 67-1, 3. This is the pulse labeled $a$ in FIG. 7. The next output pulse comes from comparator 68-1, 2 (not shown) when the output voltage from generator 63 matches the output voltage from divider 67-1, 2 (not shown). This is the pulse labeled $b$ in FIG. 7. The last output pulse occurs when the voltage from divider 67-1, 1 matches the voltage from ramp generator 63. This is the output pulse labeled $c$ in FIG. 7. Because the subsignal being analyzed is actually the fundamental frequency of the complex periodic signal detected by transducer 1 (FIG. 6), this last pulse occurs at a time proportional to this fundamental frequency.

The other harmonics analyzed in FIG. 7, are the second, third and fifth harmonics. Voltages representing the frequencies of these harmonics are similarly divided by selected integers and the resulting quotient voltages are compared to the voltage from ramp generator 63 (FIG. 6) to produce pulses at times corresponding to the quotient frequencies. Thus, the pulse labeled $d$ corresponds to the frequency of the second harmonic divided by two; the pulse labeled $e$ corresponds to the frequency of the third harmonic divided by three; and the pulse labeled $g$ corresponds to the frequency of the fifth harmonic divided by five. It is seen that the pulses labeled $c$, $d$, $e$, and $g$, which all occur at a time corresponding to the fundamental frequency, occur simultaneously. Thus, the output signal from network 71 (FIG. 6) contains one large pulse at a time proportional to the fundamental frequency and other smaller pulses at times corresponding to other frequencies. The fundamental frequency is easily determined in analyzer 72 by detecting the time of occurrence of this maximum pulse.

Other embodiments of this invention will be obvious to those skilled in the signal processing arts in light of this disclosure.

What is claimed is:

1. The method of determining the fundamental period of a complex periodic signal which comprises
    determining the period of each harmonic present in the complex periodic signal,
    multiplying each period by a plurality of integers to produce a plurality of products associated with each harmonic, and
    determining the most frequently occurring product common to all harmonics, this product equalling the fundamental period of the complex periodic signal.

2. The method of determining the fundamental period of a complex periodic signal which comprises
    producing a plurality of pulse sequences for each of a selected number of harmonic components of said complex periodic signal, the pulses in each sequence possessing a repetition rate inversely proportional to the period of a corresponding selected one of said harmonic components,
    summing all of the resulting pulse sequences, produced for each of said selected harmonics, to produce a series of nonuniform amplitude pulses, and
    determining the period of the fundamental component of said complex periodic signal by determining the time of occurrence of the maximum amplitude pulse in said series, said time being proportional to said fundamental period.

3. The method of claim 2 including, in addition, the step of
    weighting each of said pulse sequences an amount proportional to the logarithm of the amplitude of the harmonic component from which it was derived before summing said pulse sequences to produce said series of nonuniform amplitude pulses.

4. Apparatus for detecting the fundamental period of a complex periodic signal which comprises
    means for dividing said complex periodic signal into a plurality of subsignals,
    means for producing voltages proportional to the periods of said plurality of subsignals,
    means for producing a plurality of pulse sequences, the pulses in each sequence possessing a repetition rate inversely proportional to a corresponding one of said voltages,
    means for summing said pulse sequences to produce a series of nonuniform amplitude pulses, and
    means for generating a voltage proportional to the fundamental period of said complex periodic signal by measuring the time of occurrence of the maximum amplitude pulse in said series.

5. Apparatus as in claim 4 including
means for weighting the amplitudes of the pulses in each of said pulse sequences by an amount proportional to the logarithm of the amplitude of the subsignal from which the pulse sequence was derived.

6. The method of determining the fundamental frequency of a complex periodic signal which comprises
determining the frequencies of the detectable harmonic components of said complex periodic signal,
dividing each of said frequencies by a corresponding plurality of selected integers to produce a multiplicity of quotient frequencies, and
analyzing said quotient frequencies to determine the largest quotient frequency common to all detectable harmonics, this quotient frequency equalling the fundamental frequency of said complex periodic signal.

7. Apparatus for determining the fundamental frequency of a complex periodic signal which comprises
means for dividing said complex periodic signal into a plurality of subsignals,
means for converting the frequencies of said subsignals to voltages,
means for dividing each of said voltages according to a plurality of selected integer values to produce a multiplicity of quotient signals,
means for determining from said multiplicity of quotient signals the quotient signal common to all said subsignals, this common quotient signal being proportional to the fundamental frequency of said complex periodic signal, and
means for converting this common quotient signal to a replica of the fundamental frequency of said complex periodic signal.

8. Apparatus as in claim 7 in which said means for determining comprises
means for determining the most frequently occurring quotient signal, this quotient signal being proportional to the fundamental frequency of said complex periodic signal.

9. Apparatus as in claim 7 including
means for weighting each of said quotient signals by an amount proportional to the logarithm of the amplitude of the subsignal from which said quotient signal was derived.

References Cited
UNITED STATES PATENTS

| | | |
|---|---|---|
| 2,627,541 | 2/1953 | Miller. |
| 2,699,464 | 1/1955 | Di Toro et al. |
| 3,243,703 | 3/1966 | Wood. |
| 3,395,345 | 7/1968 | Rader. |

RUDOLPH V. ROLINEC, Primary Examiner

P. F. WILLE, Assistant Examiner

U.S. Cl. X.R.

179—1